Jan. 25, 1949.

A. A. McMURRAY 2,460,101

OPTICAL METHOD OF TESTING MILK
FOR RELATIVE UNIFORMITY
Filed April 15, 1946

INVENTOR.
ARTHUR A. McMURRAY
BY J. H. Weatherford
atty.

Patented Jan. 25, 1949

2,460,101

UNITED STATES PATENT OFFICE 2,460,101

OPTICAL METHOD OF TESTING MILK FOR RELATIVE UNIFORMITY

Arthur A. McMurray, Nashville, Tenn.

Application April 15, 1946, Serial No. 662,170

2 Claims. (Cl. 88—14)

This invention relates to a method of testing cow's milk for a disease known as mastitis, or inflammation of the mammary glands, and to a simple and effective device which may be used in making such a test.

Cow's milk is ordinarily tested by drawing milk samples from each of the four teats or quarters of the udder, it usually happening, where trouble exists, that some of the quarters are affected and some are not. In the usual test, a sample is drawn from a single quarter onto an inclined plate and visual observation made of the color as the sample gravitates over this surface and through a strainer. Similar observation is made of succeeding quarters.

The objects of the present invention are:

To provide a method of comparing samples drawn from each quarter of an udder, which method is accomplished by superposing milk from one quarter on that from another quarter and determining by the blending of the samples or the dilution of one by the other whether the samples are of uniform or unequal consistencies and color.

A further object is:

To provide a device for readily accomplishing such a test.

The means by which the foregoing and other objects are accomplished, and the manner of their accomplishment, will readily be understood from the following specification upon reference to the accompanying drawings, in which.

Figure 1:
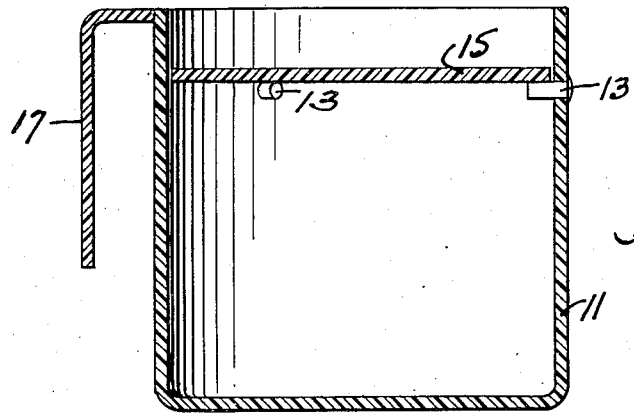
Fig. 1 is a sectional elevation.
Figure 2:
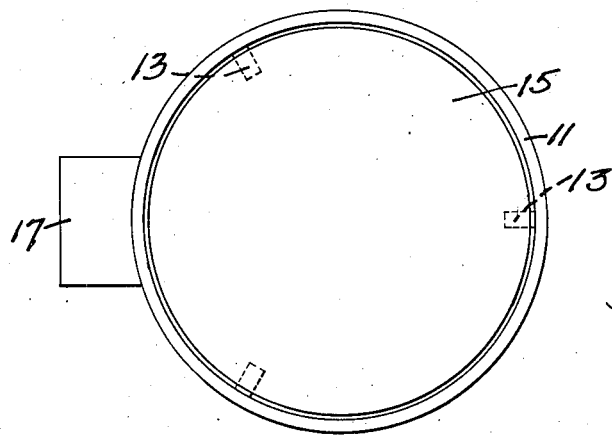
Fig. 2 is a plan view of the preferred form of the test cup.

Referring now to the drawings in which the various parts are indicated by numerals:

11 is a cup, having inwardly projecting pins or supports 13 on which a disc 15 is supported, the support being disposed well below the top of the cup so that the top of the disc is also therebelow, and a rim is provided around and above the disc. The disc 15 is of a non-absorbent material, such as Bakelite, and is of a dark color, such as black, or other color contrasting with the color of milk. The disc is of diameter to loosely fit within the cup and easily removable by pressing down on the disc edge between any two of the supports. The cup may have a handle 17, adapted to hook over the belt when the cup is not in use.

In accordance with the present invention, the test is made by holding the cup so that the disc is level, milking from a single teat on the disc, allowing the milk to spread as nearly uniformly as possible over the disc and any surplus to run into the cup, the milk, if from a normal quarter, having a good body and masking the dark color of the disc. A stream from a second teat is then milked directly on the milk from the first teat and if the colors blend uniformly, a third teat is tried and then the fourth teat. If any one of the quarters, however, is affected by mastitis the milk from that quarter is watery and dilutes the milk of the previous quarter, or quarters, so that the dark color of the disc shows up and gives indication of the trouble, even the slightest trouble being definitely apparent. Obviously if milk from all four teats shows up of uniform consistency and of good body no trouble is indicated.

I claim:

1. The method of testing the milk product of the teats of an animal udder for relative uniformity which includes the steps of disposing a relatively dark surface in a level position, drawing a sample of milk from one of said teats and spreading the milk from said teat uniformly over said surface to establish a coating masking said surface, the portions of said sample in excess of said coating overflowing from the surface, drawing a sample of milk of less quantity from a second said teat, discharging said second sample onto said coating to mingle therewith and overflow portions thereof beyond said surface to establish a second masking consisting of milk from both said samples, the quantity of milk in said second masking being substantially equal to the quantity of milk in the first said masking, repeating said overflowing operation for the others of said teats, while maintaining masking of said surface by a substantially uniform quantity of milk, unless and until said masking is disrupted by milk from a teat, which milk is not uniform in quality to said masking milk, whereby to successively establish comparisons of relative uniformity between the milks from the respective said teats with the preceding coating maskings.

2. The method of testing the milk product of the teats of an animal udder for relative uniformity which includes the steps of disposing a relatively dark surface in a level position, drawing from one of said teats a sample of milk consisting of a minor quantity only, discharging said sample onto said surface to spread over said surface and effect masking thereof with a thin, substantially uniform coating of said milk, the portions of said sample in excess of said coating overflowing the periphery of said surface, drawing from a second said teat a sample of milk of less quantity than said first sample, discharging said second sample onto the masking formed by said first sample to mingle therewith and to overflow additional portions thereof beyond said surface, to create a second masking of said surface consisting of milk from both said samples, the quantity of milk in said second masking being substantially equal to the quantity of milk in said first masking, drawing from a third said teat a sample of milk substantially equal in quantity to said second sample, discharging said third sample onto said second masking to mingle therewith and to overflow portions thereof beyond said surface, to create a third masking of said surface consisting of milk from said three samples, the quantity of milk in said third masking, being substantially equal to the quantity of milk in said second masking, and drawing from the fourth said teat a sample of milk substantially equal in quantity to said second sample, discharging said fourth sample onto said third masking to mingle therewith and to overflow portions thereof beyond said surface, to create a fourth masking of said surface consisting of milk from said four samples, the quantity of milk in said fourth masking being substantially equal to the quantity of milk in said third masking, whereby to successively establish comparisons of relative uniformity of said samples with the respective preceding said maskings.

ARTHUR A. McMURRAY.

REFERENCES CITED

The following references are of record in the file of this patent:

UNITED STATES PATENTS

| Number    | Name     | Date          |
|-----------|----------|---------------|
| 1,293,793 | Kaddatz  | Feb. 11, 1919 |
| 1,806,806 | Kocour   | May 26, 1931  |
| 2,162,159 | Case     | June 13, 1939 |

FOREIGN PATENTS

| Number | Country       | Date         |
|--------|---------------|--------------|
| 406    | Great Britain | Jan. 2, 1884 |